United States Patent [19]

Seiler et al.

[11] Patent Number: 4,906,737
[45] Date of Patent: Mar. 6, 1990

[54] AZO DYE OF THE PYRIDONE SERIES CONTAINING A FLUORO-S-TRIAZINYL FIBRE-REACTIVE GROUP

[75] Inventors: Herbert Seiler, Riehen; Gert Hegar, Schönenbuch, both of, Switzerland, legal representative of said Gert Hagar isEsther Hegar-Zimmerman also of Schönenbuch, CHX; Ester Hegar-Zimmerman, legal representative of Gert Hegar, deceased

[73] Assignee: Ciba-Geigy Corporation, Ardsley, N.Y.

[21] Appl. No.: 233,923

[22] Filed: Aug. 17, 1988

Related U.S. Application Data

[63] Continuation of Ser. No. 625,409, Jun. 28, 1984, abandoned, which is a continuation of Ser. No. 452,981, Dec. 27, 1982, abandoned, which is a continuation-in-part of Ser. No. 122,158, Feb. 19, 1980, abandoned, which is a continuation of Ser. No. 19,198, Mar. 9, 1979, abandoned, which is a continuation of Ser. No. 915,341, Jun. 13, 1978, abandoned, which is a continuation of Ser. No. 736,054, Oct. 27, 1976, abandoned.

[30] Foreign Application Priority Data

Nov. 6, 1975 [CH] Switzerland .................. 14348/75
Oct. 18, 1976 [CH] Switzerland .................. 13162/76

[51] Int. Cl.$^4$ ............... C09B 62/00; C09B 62/04; C09B 62/08; D06P 1/382
[52] U.S. Cl. .................. 534/635; 534/618; 534/622; 534/628; 534/632; 534/636; 534/637; 534/638; 544/181; 544/187; 544/189; 544/208; 544/209; 544/210

[58] Field of Search ......................... 534/635

[56] References Cited

U.S. PATENT DOCUMENTS 3,711,460 1/1973 Schundehutte ............ 260/153 X
4,066,389 1/1978 Riat et al. ................. 260/153 X

FOREIGN PATENT DOCUMENTS 2557141 7/1976 Fed. Rep. of Germany ... 260/146 T
1188606 4/1970 United Kingdom ............ 260/153
1189312 4/1970 United Kingdom ............ 260/153
1271226 4/1972 United Kingdom ............ 534/635

Primary Examiner—Floyd D. Higel
Attorney, Agent, or Firm—Wenderoth, Lind & Ponack

[57] ABSTRACT

Fibre-reactive dyes of the formula

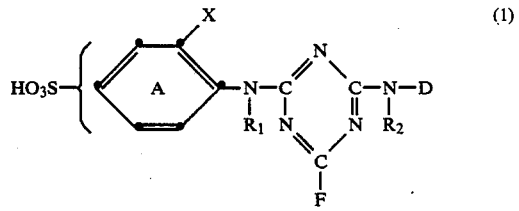

wherein X is an alkyl or alkoxy group of 1 to 4 carbon atoms, a carboxy group or a halogen atom, each of $R_1$ and $R_2$ is independently a hydrogen atom or an alkyl group of 1 to 4 carbon atoms and D is the radical of an organic dye which contains sulpho groups, and the benzene ring A can contain further substituents apart from X and $SO_3H$.

1 Claim, No Drawings

AZO DYE OF THE PYRIDONE SERIES CONTAINING A FLUORO-S-TRIAZINYL FIBRE-REACTIVE GROUP

This application is a continuation of now abandoned application Ser. No. 625,409, filed June 28, 1984, which application is a continuation of now abandoned application Ser. No. 452,981, filed December 27, 1982, which application is a continuation-in-part of now abandoned application Ser. No. 122,158, filed February 19, 1980, which application is a continuation of now abandoned application Ser. No. 019,198, filed March 9, 1979, which application is a continuation of now abandoned application Ser. No. 915,341, filed June 13, 1978, which application is, in turn, a continuation of now abandoned application Ser. No. 736,054, filed October 27, 1976.

The present invention provides fibre-reactive dyes of the formula

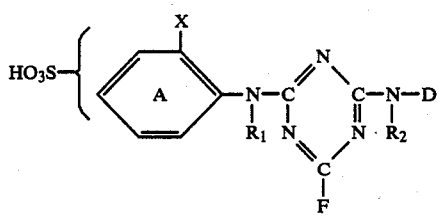

wherein X represents an alkyl or alkoxy group of 1 to 4 carbon atoms, a carboxy group or a halogen atom, and each of $R_1$ and $R_2$ independently represents a hydrogen atom or an alkyl group of 1 to 4 carbon atoms and D is the radical of an organic dye containing sulpho groups, and the benzene ring A can contain further substituents apart from X and $SO_3H$.

Possible $C_1-C_4$-alkyl groups X are methyl, ethyl, propyl, iso-propyl, butyl, iso-butyl, sec. butyl and tert. butyl, whilst possible $C_1-C_4$-alkoxy groups are methoxy, ethoxy, propyloxy, iso-propyloxy, butyloxy groups. Halogen denotes fluorine, chlorine and bromine atoms. $C_1-C_4$-alkyl groups represented by $R_1$ and $R_2$ are the same as those indicated above for X. The radical D is in particular the radical of a sulpho group-containing dye of the mono-or polyazo, metal complex, formazane, anthraquinine, phthalocyanine, stilbene, oxazine, dioxazine, triphenylmethane, nitro or azomethine series. In addition to X and $SO_3H$, the benzene ring A can contain as further substituents for example: alkyl groups, such as methyl, ethyl and propyl groups; alkoxy groups, such as methoxy, ethoxy, propyloxy and iso-propyloxy groups; acylamino groups, such as acetylamino and propionylamino groups; amino groups, such as $NH_2$, methylamino and ethylamino groups; the ureido, carboxy and sulpho group; and halogen atoms, such as fluorine, chlorine and bromine atoms. The benzene ring A does not contain a sulpho group in ortho-position to

The bracket after the $HO_3S$ group in formula (1) encompasses both meta-positions and the para-position to the

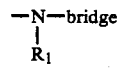

at the benzene ring A.

Preferred fibre-reactive dyes are those of the formula (1) wherein X is a methyl, methoxy or carboxy group or a chlorine atom and each of $R_1$ and $R_2$ is a hydrogen atom, D is as defined in formula (1), and the benzene ring A contains no further substituents apart from X and $SO_3H$.

Particularly preferred fibre-reactive dyes are those of the formula (1) wherein X, $R_1$, $R_2$ and A are as defined in formula (1), and D is the radical of an azo dye containing sulpho groups, chiefly fibre-reactive dyes of the formula (1), wherein X is a methyl, methoxy or carboxy group or a chlorine atom, each of $R_1$ and $R_2$ is a hydrogen atom and the benzene ring A contains no further substituents apart from X and $SO_3H$.

Among these dyes, an important group comprises the fibre-reactive dyes of the formula

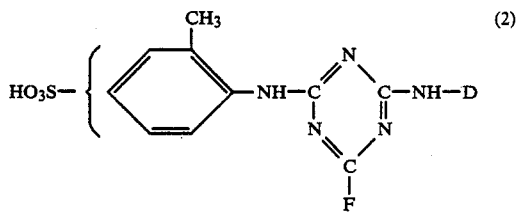

wherein D is the radical of an azo dye containing sulpho groups.

The dyes of the formula (1) are fibre-reactive, since they contain a removable fluorine atom in the s-triazine radical.

By fibre-reactive compounds are meant those which are capable of reacting with the hydroxy groups of cellulose or with the amino groups of natural or synthetic polyamides to form covalent chemical bonds.

The fibre-reactive dyes of the formula (1) are obtained by condensing 2,4,6-trifluoro-1,3,5-triazine with a compound of the formula

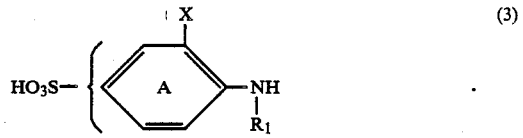

wherein X, $R_1$ and A are as defined in formula (1), and condensing the condensation product, in optional sequence, with a dye of the formula

wherein $R_2$ and D are as defined in formula (1), to give a fibre-reactive dye of the formula (1).

Thus 2,4,6-trifluoro-s-triazine can be condensed initially with a compound of the formula (3) and the condensation product then condensed with a dye of the formula (4) to give a fibre-reactive dye of the formula (1). However, it is also possible to condense 2,4,6-trifluoro-s-triazine first with a dye of the formula (4) and subsequently to condense the condensation product with a compound of the formula (3) to give a fibre-reative dye of the formula (1).

Preferably compounds of the formulae (3) and (4) are used as starting materials, wherein X is a methyl, methoxy or carboxy group or a chlorine atom, and each of $R_1$ and $R_2$ is a hydrogen atom, D is as defined in formula (1) and the benzene ring A contains no further substituents apart from X and $SO_3H$.

A preferred embodiment of the process for obtaining the fibre-reactive dyes of the formula (1) comprises the use of compounds of the formulae (3) and (4) as starting materials, wherein X, $R_1$, $R_2$ and A are as defined in formula (1) and D is the radical of an azo dye containing sulpho groups.

In particular, compounds of the formulae (3) and (4) are used as starting materials, wherein X is a methyl, methoxy or carboxy group or a chlorine atom, each of $R_1$ and $R_2$ is a hydrogen atom and D is the radical of an azo dye containing sulpho groups, and the benzene ring A contains no further substituents apart from X and $SO_3H$.

The preferred fibre-reactive dyes of the formula

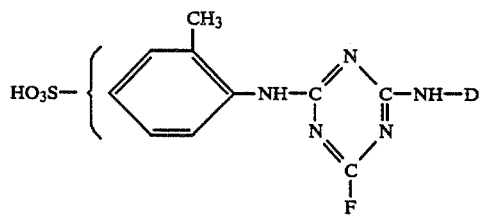
(2)

wherein D is the radical of an azo dye containing sulpho groups, are obtained for example by condensing 2,4,6-trifluoro-1,3,5-triazine with a compound of the formula

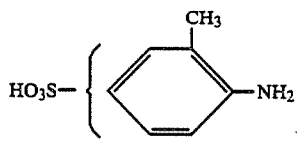
(5)

and condensing the condensation product with a dye of the formula $H_2N—D$ (6)

wherein D is as defined in formula (2), to give a fibre-reactive dye of the formula (2).

If D is the radical of an azo dye containing sulpho groups, that part of the azo dye radical to which the fluoro-s-triazine radical is directly attached can either be the radical of the diazo component or the radical of the coupling component. In this way, two possible modifications of the above described process for the manufacture of the fibre-reactive dyes of the formula (1) ensue. The first modification comprises (a) monocondensing 2,4,6-trifluoro-1,3,5-triazine with a compound of the formula

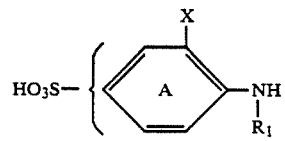
(3)

wherein X, $R_1$ and A are as defined in formula (1), condensing the primary condensation product with an aromatic diamine which contains a $\begin{array}{c} HN \\ | \\ R_2 \end{array}$ group, diazotising the secondary condensation product and coupling it to a coupling component, the aromatic diamine and the coupling component together containing at least one sulpho group; and the second modification comprises (b) condensing 2,4,6-trifluoro-1,3,5-triazine with a compound of the formula (3), wherein X, $R_1$ and A are as defined in formula (1), condensing the primary condensation product with a coupling component which contains a $\begin{array}{c} HN \\ | \\ R_2 \end{array}$ group, and coupling a diazotised aromatic amine to the secondary condensation product, the coupling component and the aromatic amine together containing at least one sulpho group.

In both modifications (a) and (b), the condensation with the compound of the formula (3) in the final step is also possible.

In the above described process modifications (a) and (b), the preferred starting materials are compounds of the formula (3) and aromatic diamines which contain a $\begin{array}{c} HN \\ | \\ R_2 \end{array}$ group and coupling components which contain a $\begin{array}{c} HN \\ | \\ R_2 \end{array}$ group, wherein X is a methyl, methoxy or carboxy group or a chlorine atom and each of $R_1$ and $R_2$ is a hydrogen atom, the diazo and coupling components together containing at least one sulpho group, and the benzene ring A contains no further substituents apart from X and $SO_3H$.

The preferred fibre-reactive dyes of the formula

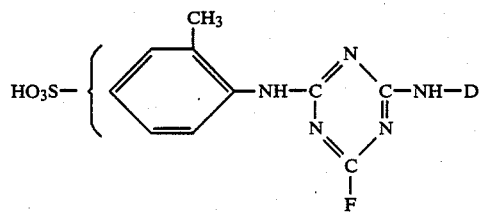
(2)

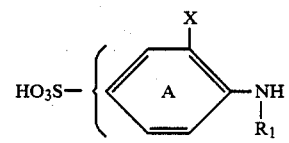
(3)

wherein D is the radical of an azo dye containing sulpho groups, are obtained by the above described process modifications by, for example, (a) monocondensing 2,4,6-trifluoro-1,2,5-triazine with a compound of the formula

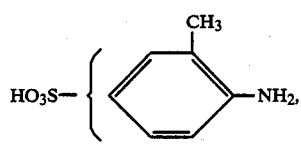
(5)

condensing the primary condensation product with an aromatic diamine which contains a

HN
|
$R_2$ group, diazotising the secondary condensation product and coupling it to a coupling component, the aromatic diamine and the coupling component together containing at least one sulpho group, or by (b) condensing 2,4,6-trifluoro-1,3,5-triazine with a compound of the formula (5), condensing the primary condensation product with a coupling component which contains a

HN
|
$R_2$ group, and coupling a diazotised aromatic amine to the secondary condensation product, the coupling component and the aromatic amine together containing at least one sulpho group.

The above described process modifications for obtaining fibre-reactive dyes of the formula (1), wherein D is the radical of an azo dye containing sulpho groups, in which 2,4,6-trifluoro-1,3,5triazine or the primary condensation product of 2,4,6-trifluoro-1,3,5-triazine and a compound of the formula (3) is combined first with a component of the radical D and the resultant intermediate is subsequently combined with the other component of the radical D to give the desired end product, can also be used for obtaining other fibre-reactive dyes of the formula (1).

Thus, in general, fibre-reactive dyes of the formula (1), wherein D is the radical of an organic dye containing sulpho groups which is composed of two or more than two components, can be obtained by condensing 2,4,6-trifluoro-1,3,5-triazine with a compound of the formula wherein X, $R_1$ and A are as defined in formula (1), condensing the primary condensation product with a component of the radical D which contains a

HN
|
$R_2$ group, and reacting the secondary condensation product with the second component (or with the further components) of the radical D, the components together containing at least one sulpho group, to give the fibre-reactive dye of the formula (1).

The condensation with the compound of the formula (3) can also be carried out in the final step.

Examples of such organic dyes which are composed of two or more than two components are: monoazo, disazo, trisazo, tetrazo, metal complex, formazane and azomethine dyes.

As starting materials for the manufacture of the fibre-reactive dyes of the formula (1) there may be mentioned:

(a) 2,4,6-trifluoro-1,3,5-triazine (cyanuric fluoride)
(b) Compounds of the formula (3)
1-amino-2-methylbenzene-4-sulphonic acid,
1-amino-2-methylbenzene-5-sulphonic acid,
1-amino-2-methoxybenzene-5-sulphonic acid,
1-amino-2-ethoxybenzene-5-sulphonic acid,
1-amino-2-carboxybenzene-4-sulphonic acid,
1-amino-2-carboxybenzene-5-sulphonic acid,
1-amino-2-chlorobenzene-4-sulphonic acid,
1-amino-2-bromobenzene-4-sulphonic acid,
1-amino-2-chlorobenzene-5-sulphonic acid,
1-amino-2,5-dichlorobenzene-4-sulphonic acid,
1-amino-2,4-dimethylbenzene-5-sulphonic acid,
1-amino-2,5-dimethoxybenzene-4-sulphonic acid,
1-methylamino-2-carboxybenzene-4-sulphonic acid,
1-ethylamino-2-carboxybenzene-4-sulphonic acid.
(c) Dyes containing amino groups of the formula (4)
1. Azo Dyes

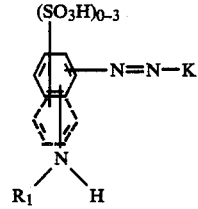
(6)

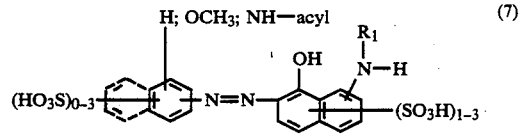
(7)

-continued

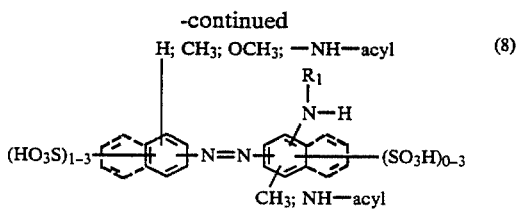

In the above formulae, K is the radical of a coupling component of the benzene, naphthalene or heterocyclic series, acyl is a low molecular aliphatic acyl radical of not more than 3 carbon atoms or an aromatic radical of not more than 8 carbon atoms and $R_1$ is as defined in formula (1).

2. Metal Complex Azo Dyes

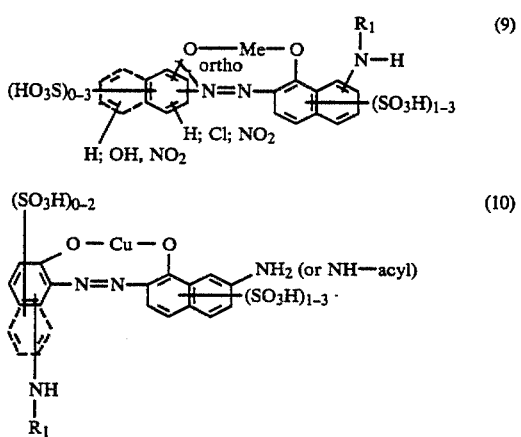

wherein $R_1$ and acyl are as defined in the formulae (6), (7) and (8) and Me represents Cu, Cr or Co.

3. Anthraquinone Dyes

The following compounds may be mentioned as examples of dye compounds of the anthraquinone series which can be used as starting materials in the process of the present invention: anthraquinone compounds which contain a group of the formula —NHR as defined above, bonded to an alkylamino or arylamino group, which itself is bonded to the α-position of the anthraquinone nucleus. As examples of such anthraquinone compounds there may be mentioned: 1-amino-4-(4'-aminoaniline)-anthraquinone-2,3'-disulphonic acid and the corresponding 2,3',5-, 2,3',6- and 2,3',7-trisulphonic acids, 1-amino-4-(4"-amino-4'-benzoylaminoaniline)-anthraquinone-2,3-disulphonic acid and the corresponding -2,3',5-trisulphonic acid, 1-amino-4-[4'-(4"-aminophenylazo)-anilino]-anthraquinone-2,2",5-trisulphonic acid, 1-amino-4-(4'-amino-3'-carboxyanilino)-anthraquinone-2,5-disulphonic acid, 1-amino-4-(3'-aminoanilino)-anthraquinone-2,4',5-trisulphonic acid and the corresponding 2,4-disulphonic acid, 1-amino-4-['-(4"-aminophenyl)-anilino]-anthraquinone-2,3",5-trisulphonic acid, 1-amino-4-(4'-methylamino)-anilinoanthraquinone-2,3'-disulphonic acid and the corresponding 2,3',5-trisulphonic acid, 1-amino-4-(4'-n-butylamino)-anilinoanthraquinone-2,3'-disulphonic acid, 1-amino-4-(4'-methylamino-3'-carboxyanilino)-anthraquinone-2-sulphonic acid, 1-amino-4-(3'-β-hydroxyethylamino)-anilinoanthraquinone-2,5-disulphonic acid, 1-(4'-aminoanilino)-anthraquinone-2,3'-disulphonic acid and 1-amino-4-(4'-amino-2'-methoxyanilino)-anthraquinone-2,3'-disulphonic acid.

Such dye compounds of the anthraquinone series can themselves be obtained from anthraquinone compounds which contain a halogen atom or a nitro group bonded to the corresponding α-position of the anthraquinone nucleus, or from the leuco derivative of a 1,4-dihydro-, -diamino- or -amino-hydroxy-anthraquinone by reacting the corresponding anthraquinone compound with at least one molar proportion of an aliphatic or aromatic diamine.

4. Phthalocyanine Dyes

Dye compounds of the phthalocyanine series which can be used in the process according to the invention are preferably metal-containing phthalocyanines, such as copper phthalocyanines, which contain at least one water-solubilising group, such as a sulphonic acid group, and at least one group of the formula —NHR, as defined above. The —NHR group or groups can be bonded directly or through a divalent bridge to the benzene rings of the phthalocyanine nucleus, for example through a —phenylene—, —CO-phenylene—, —SO$_2$-phenylene—, —NH-phenylene—, —S-phenylene—, —O-phenylene—, —CH$_2$S-phenylene—, —CH$_2$O-phenylene—, —CH$_2$-phenylene—, —SCH$_2$-phenylene—, —SO$_2$CH$_2$-phenylene—, —SO$_2$NR$_1$-phenylene—, —CH$_2$—, —SO$_2$NR$_1$-arylene, —NR$_1$CO-phenylene—, —NR$_1$SO$_2$-phenylene—, —SO$_2$O-phenylene—, —CH$_2$—, —CH$_2$NR$_1$-phenylene—, —CH$_2$NH—CO-phenylene—, —SO$_2$NR$_1$-alkylene—, —CH$_2$NR$_1$-alkylene—, —CONR$_1$-phenylene—, —CONR$_1$-arylene—, —SO$_2$— or —CO— bridge. In the above divalent bridge members, $R_1$ is a hydrogen atom, an alkyl or cycloalkyl group, arylene denotes a divalent aromatic radical which is optionally substituted, for example by halogen atoms, alkyl or alkoxy groups, and wherein the terminal bonds may be attached to identical or different nuclei, and alkylene denotes a divalent aliphatic radical which can include heteroatoms, such as nitrogen, in the chain of atoms, for example the radical —CH$_2$CH$_2$—NH—CH$_2$CH$_2$—.

As examples of such divalent aromatic radicals, which are referred to as arylene, there may be mentioned: aromatic nuclei, for example a benzene, naphthalene, acridine and carbazole nucleus, which can carry further substituents, and radicals of the formula

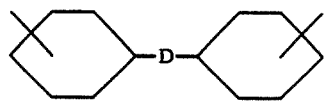

wherein the benzene rings can carry further substituents and —D— denotes a bridging group, for example —CH=CH—, —NH—, —S—, —O—, —SO$_2$—, —NO=N—, —N=N—, —NH—CO—NH—CO—NH—, —O—CH$_2$CH$_2$O— or

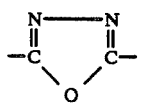

As specific examples of dye compounds of the phthalocyanine series which can be used in the process according to the invention, there may be mentioned copper phthalocyanine-4-N-(4-amino-3-sulphophenyl)-sulphonamide-4', 4",4"'-trisulphonic acid, cobalt phthalocyanine-4,4'-di-N-(4'-amino-4'-sulphophenyl)- carboxamide-4'',4'''-dicarboxylic acid and copper 4-(4'-amino-3'-sulphobenzoyl)-phthalocyanine.

Mixtures of aminophthalocyanines can also be used. For example, a mixture of approximately equal parts of copper phthalocyanine-N-(4-amino-3-sulphophenyl)-sulphonamide-trisulphonic acid and copper phthalocyanine-di-N-(4-amino-3-sulphophenyl)-sulphonamide-disulphonic acid can be used.

The aminophthalocyanines containing a sulphonic acid can be obtained either by sulphonation of known phthalocyanines containing primary or secondary amino groups or by synthesis from mixtures of phthalic acid derivatives and sulphonated phthalic acid derivatives. Sulphonating agents used are for example oleum, for example a 20% solution of sulphur trioxide in sulphuric acid. Furthermore, they can be obtained by warming together suitable derivatives of sulphonated phthalic acid and substituted phthalic acids in accordance with the process commonly known in the art, for example by warming together a mixture of 4-sulphophthalic anhydride and 4-p-nitrobenzoylphthalic anhydride, urea, copper(II) chloride and ammonium molybdate in o-dichlorobenzene at about 150° C. Phthalocyanines which are used as starting materials can also be prepared by sulphonation of the corresponding primary and secondary amines or by reacting of a primary (or secondary N-alkyl- or -cycloalkyl)-nitroaniline with a phthalocyanine which contains chloromethyl groups and sulphonic acid groups or carboxylic acid groups. Furthermore, such aminophthalocyanines can also be prepared by reacting a phthalocyanine, which contains chlorosulphonyl groups, with a monoacetylalkylenediamine or an amino-N-benzylacetamide in the presence of water and treatment of the product thus obtained (which contains both sulphonamide groups and sulphonic acid groups) with aqueous alkali to hydrolyse the acetylamino group, or by reacting a phthalocyanine, which contains chloromethyl groups and sulphonic acid groups or carboxylic acid groups, with a monoacetylalkylenediamine, and treating the resultant product with aqueous alkali to hydrolyse the acetylamino groups. Furthermore, such products can be obtained by direct sulphonation or by warming together a mixture of suitable carboxyl or sulphophthalic acid derivatives with substituted phthalic acid derivatives, for example by warming the anhydrides with urea and a catalyst, in an organic solvent, and reduction of the resultant nitrophthalocyaninesulphonic or -carboxylic acid or hydrolysis of the resultant acylaminophthalocyaninesulphonic or -carboxylic acid, or by reacting a phthalocyanine compound, which contains carboxylic acid chloride groups, with a diaminobenzenesulphonic acid or -carboxylic acid, an aminobenzenesulphonic acid or an aminobenzoic acid, which also contains a nitro group, and reducing the nitro compound so obtained, or, finally, by reacting a phthalocyanine compound, which contains carboxylic acid chloride groups, with a N-aminobenzylacetamide, and subsequently hydrolysing the resultant product with aqueous alkali.

5. Nitro Dyes

Dye compounds of the nitro series, which can be used in the process of the present invention, are preferably those of the formula

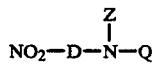  (13)

wherein D is a naphthalene or benzene nucleus which can be further substituted, the nitrogen atom N is in the orthoposition to the nitro group, Z is a hydrogen atom or an optionally substituted hydrocarbon radical and Q is a hydrogen atom or an organic radical bonded to the nitrogen atom by a carbon atom, and wherein Q and Z are not both hydrogen atoms, and Q can be bonded to Z, if Z is a hydrocarbon radical, or can be bonded to D in the ortho-position to the nitrogen atom N to form a heterocyclic ring, and which contain at least one group of the formula —NHR, as defined above.

As special examples of dye compounds which contain at least one —NHR group and which can be used as starting materials in the process of the present invention, the compounds of the following classes may be mentioned:

1. Monoazo compounds of the formula

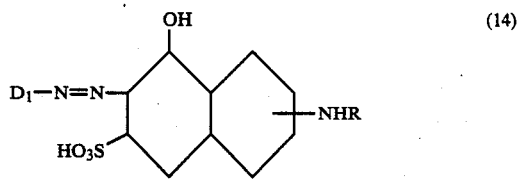  (14)

wherein $D_1$ is an at most bicyclic aryl radical which contains no azo groups and —NHR groups and the —NHR group is preferably bonded to the 6-, 7- or 8-position of the naphthalene nucleus, and which can contain a sulphonic acid group in the 5- or 6-position of the Naphthalene Nucleus.

$D_1$ can be a radical of the naphthalene or benzene series which does not contain an azo substituent, for example a stilbene, diphenyl, benzthiazolylphenyl or diphenylamine radical. In this class, attention is also drawn to the related dyes in which the —NHR group, instead of being bonded to the naphthalene nucleus, is bonded to a benzoylamino or anilino group which is bonded to the 6-, 7- or 8-position of the naphthalene nucleus.

Particularly useful starting dyes are those wherein $D_1$ is a sulphonated phenyl or naphthyl radical, especially those which contain a —SO$_3$H group in the ortho-position to the azo bond, and the phenyl radical can be further substituted, for example by halogen atoms, such as chlorine atoms, alkyl groups, such as methyl groups, acylamino groups, such as acetylamino groups, and alkoxy groups, such as methoxy groups.

2. Disazo compounds of the formula indicated in class 1, wherein $D_1$ is a radical of the azobenzene, azonaphthalene or phenylazonaphthalene series and the naphthalene nucleus is substituted by the —NHR group and, if desired, by sulphonic acid, as in class 1.

3. Monoazo compounds of the formula

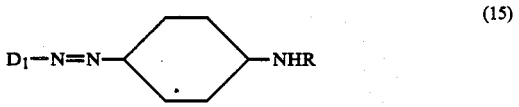  (15)

wherein $D_1$ is an at most bicyclic aryl radical, as described in class 1, and preferably a disulphonaphthyl radical or stilbene radical, and the benzene nucleus can contain further substituents, such as halogen atoms or alkyl, alkoxy, carboxylic acid and acylamino groups.

4. Monoazo or disazo compounds of the formula

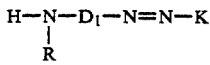 (16)

wherein $D_1$ is an arylene radical, such as a radical of the azobenzene, azonaphthalene or phenylazonaphthalene series or, preferably, an at most bicyclic arylene radical of the benzene or naphthalene series and K is the radical of a naphtholsulphonic acid or the radical of an enolised or enolisable ketomethylene compound (such as an acetoacetarylide or a 5-pyrazolone) with the OH group in the ortho-position to the azo group. $D_1$ preferably is a radical of the benzene series, which contains a sulphonic acid group.

5. Monoazo or disazo compounds of the formula

 (17)

wherein $D_1$ is a radical of the types defined for $D_1$ in classes 1 and 2 above and $K_2$ is the radical of an enolisable ketomethylene compound, (such as an acetoacetarylide or a 5-pyrazolone) with the OH group in the ortho-position to the azo group.

6. The metal complex compounds, for example the copper complexes, chromium complexes and cobalt complexes, of the dye of the indicated formulae, wherein each of $D_1$, K and $K_2$ has the indicated meaning and furthermore a metallisable group (for example a hydroxyl, lower alkoxy or carboxylic acid group) is present in the ortho-position to the azo group in $D_1$.

7. Anthraquinone compounds of the formula

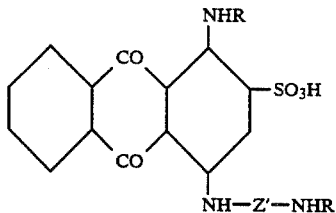 (18)

wherein the anthraquinone nucleus can contain an additional sulphonic acid group in the 5-, 6-, 7- or 8-position and Z′ is a bridge member which is preferably a divalent radical of the benzene series, for example a phenylene, diphenylene or 4,4′-stilbene or -azobenzene radical. Preferably, Z′ should contain a sulphonic acid group for each benzene ring present.

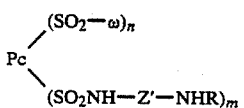 (19)

wherein Pc denotes a phthalocyanine nucleus, preferably copper phthalocyanine, ω is —OH and/or —NH$_2$, Z′ is a bridge member, preferably an aliphatic, cycloaliphatic or aromatic bridge, and each of n and m is 1, 2 or 3 and can be identical or different, provided that the sum of n+m is not greater than 4.

9. Nitro dyes of the formula

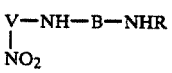 (20)

wherein V and B are monocyclic aryl nuclei and the nitro group in V is in ortho-position to the NH group.

In the classes of dyes mentioned, the following are examples of suitable starting dyes:

6-amino-1-hydroxy-2-(2′-sulphophenylazo)-naphthalene-3-sulphonic acid, 6-methylamino-1-hydroxy-2-(4′-acetylamino-2′-sulphophenylazo)-naphthalene-3-sulphonic acid, 8-amino-1-hydroxy-2-(2′-sulphophenylazo)-naphthalene-3,6-disulphonic acid, 8-amino-1-hydroxy-2-(4′-chloro-2′-sulphophenylazo)-naphthalene-3,5-disulphonic acid, 7-amino-2-(2′,5′-disulphophenylazo)-1-hydroxynaphthalene-3-sulphonic acid, 7-methylamino-2-(2′-sulphophenylazo)-1-hydroxynaphthalene-3-sulphonic acid, 7-methylamino-2-(4′-methoxy-2′-sulphophenylazo)-1-hydroxynaphthalene-3-sulphonic acid, 8-(3′-aminobenzoylamino)-1-hydroxy-2-(2′-sulphophenylazo)-naphthalene-3,6-disulphonic acid, 8-amino-1-hydroxy-2,2′-azonaphthalene-1′,3′,5′,6-tetra-sulphonic acid, 8-amino-1-hydroxy-2,2′-azonaphthalene-1′,3,5′-trisulphonic acid, 6-amino-1-hydroxy-2,2′-azonaphthalene-1′,3,5′-trisulphonic acid, 6-methylamino-1-hydroxy-2,2′-azonaphthalene-1′,3,5′-trisulphonic acid, 7-amino-1-hydroxy-2,2′-azonaphthalene-1′,3-disulphonic acid, 8-amino-1-hydroxy-2-(4′-hydroxy-3′-carboxyphenylazo)-naphthalene-3,6-disulphonic acid and 6-amino-1-hydroxy-2-(4′-hydroxy-3′-carboxyphenylazo)-naphthalene-3,5-disulphonic acid.

In class 2:

8-amino-1-hydroxy-2-[4′-(2″-sulphophenylazo)-2′-methoxy-5′-methylphenylazo]-naphthalene-3,6-disulphonic acid, 8-amino-1-hydroxy-2-[4′(4″-methoxyphenylazo)-2′-carboxyphenylazo]-naphthalene-3,6-disulphonic acid, 8-amino-1-hydroxy-2-[4′-(2″-hydroxy-3″,6″-disulpho-1″-naphthylazo)-2′-carboxyphenylazo]-napthalene-3,6-disulphonic acid, 4,4′-bis-(8″-amino-1″-hydroxy-3″,6″-disulpho-2″-napthylazo)-3,3′-dimethoxydiphenyl and 6-amino-1-hydroxy-2-[4′-(2″-sulphophenylazo)-2′-methoxy-5′-methylphenylazo]-naphthalene-3,5-disulphonic acid.

In class 3:

2-(4′-amino-2′-methylphenylazo)-naphthalene-4,8-disulphonic acid, 2-(4′-amino-2′-acetylaminophenylazo)-naphthalene-5,7-disulphonic acid, 4-nitro-4′-(4″-methylaminophenylazo)-stilbene-2,2′-disulphonic acid, 4-nitro-4′-(4″-amino-2″-methyl-5″-methoxy-phenylazo)-stilbene-2,2′-disulphonic acid, 4-amino-4′-(4″-methoxyphenylazo)-stilbene-2,2′-disulphonic acid, and 4-amino-2-methylazobenzene-2′,5′-disulphonic acid.

In class 4:

1-(2′,5′-dichloro-4′-sulphophenyl)-3-methyl-4-(3″-amino-4″-sulphophenylazo)-5-pyrazolone, 1-(4′-sulphophenyl)-3-carboxy-4-(4′-amino-3″-sulphophenylazo)-5-pyrazolone, 1-(2′-methyl-5′-sulphophenyl)-3-methyl-4-(4″-amino-3″-sulphophenylazo)-5-pyrazolone, 1-(2′-sulphophenyl)-3-methyl-4-(3″-amino-4″-sulphophenylazo)-5-pyrazolone, 4-amino-4′-(3″-methyl-1″-phenyl-4″-pyrazol-5″-onylazo)-stilbene-2,2′-disulphonic acid, 4-amino-4′-(2″-hydroxy-3″,6″-disulpho-1″-naphthylazo)-stilbene-2,2′-disulphonic acid, 8-acetylamino-1-hydroxy-2-(3′-amino-4′-sulphophenylazo)-naphthalene-3,6-disulphonic acid, 7-(3′-sulphophenyl-amino)-1-hydroxy-2-(4′-amino-2′-carboxyphenylazo)-naphthalene-3-sulphonic acid, 8-phenylamino-1-hydroxy-2-(4''-amino-2'-sulphophenylazo)-napthalene-3,6-disulphonic acid and 6-acetylamino-1-hydroxy-2-(5'-amino-2'-sulphophenylazo)-naphthalene-3-sulphonic acid.

In class 5:
1-(3'-aminophenyl)-3-methyl-4-(2',5'-disulphophenylazo)-5-pyrazolone, 1-(3'-aminophenyl)-3-carboxy-4-(2'-carboxy-4'-sulphophenylazo)-5-pyrazolone, 4-amino-4'-[3'''-methyl-4''-(2'''-disulphophenylazo)-1''-pyrazol-5''-onyl]-stilbene-2,2'-disulphonic acid and 1-(3'-aminophenyl)-3-carboxy-4-[4'''-(2''',5''''-disulphophenylazo)-2''-methoxy-5''-methylphenylazo]-5-pyrazolone.

In class 6:
The copper complex of 8-amino-1-hydroxy-2-(2'-hydroxy-5''-sulphophenylazo)-naphthalene-3,6-disulphonic acid, the copper complex of 6-amino-1-hydroxy-2-(2'-hydroxy-5'-sulphophenylazo)-naphthalene-3-sulphonic acid, the copper complex of 6-amino-1-hydroxy-2-(2'-hydroxy-5'-sulphophenylazo)-naphthalene-3,5-disulphonic acid, the copper complex of 8-amino-1-hydroxy-2-(2'-hydroxy-3'-chloro-5'-sulphophenylazo)-naphthalene-3,6-disulphonic acid, the copper complex of 6-methylamino-1-hydroxy-2-(2'-carboxy-5'-sulphophenylazo)-napthalene-3-sulphonic acid, the copper complex of 8-amino-1-hydroxy-2-[4'-(2''-sulphophenylazo)-2'-methoxy-5'-methylphenylazo]-naphthalene-3,6-disulphonic acid, the copper complex of 6-amino-1-hydroxy-2-]4'-(2'',5''-disulphophenylazo)-2'-methoxy-5'-methylphenylazo]-naphthalene-3,5-disulphonic acid, the copper complex of 1-(3'-amino-4'-sulphophenyl)-3-methyl-4-[4''-(2'''5''''-disulphophenylazo)-2''-methoxy-5''-methylphenylazo]-5-pyrazolone, the copper complex of 7-(4'-amino-3'-sulphoanilino)-1-hydroxy-2-[4''-(2''',5''''-disulphophenylazo)-2''-methoxy-5''-methylphenylazo]-naphthalene-3-sulphonic acid, the copper complex of 6-(4'-amino-3'-sulphoanilino)-1-hydroxy-2-(2''-carboxyphenylazo)-naphthalene-3-sulphonic acid, the 1,2-chromium complex of 7-amino-6'-nitro-1,2'-dihydroxy-2,1'-azonaphthalene-3,4-disulphonic acid, the 1,2-chromium complex of 6-amino-1-hydroxy-2-(2'-carboxyphenylazo)-naphthalene-3-sulphonic acid, the 1,2-chromium complex of 8-amino-1-hydroxy-2-(4'-nitro-2'-hydroxyphenylazo)-naphthalene-3,6-disulphonic acid, the 1,2-cobalt complex of 6-(4'-amino-3'-sulphoanilino)-hydroxy-2-(5''-chloro-2'-hydroxyphenylazo)-naphthalene-3-sulphonic acid, the 1,2-chromium complex of 1-(3'-amino-4'-sulphophenyl)-3-methyl-4(2''-hydroxy-4''-sulpho-1''-naphthylazo)-5-pyrazolone, the 1,2-chromium complex of 7-(4'-sulphoanilino)-1-hydroxy-2-(4''-amino-2''-carboxyphenylazo)-naphthalene-3-sulphonic acid and the 1,2-chromium complex of 1-(3'-aminophenyl)-3-methyl-4-(4''-nitro-2''-carboxyphenylazo)-5-pyrazolone.

In class 7:
1-amino-4-(3'-amino-4'-sulphoanilino)-anthraquinone-2-sulphonic acid, 1-amino-4-(4'-amino-3'-sulphoanilino-anthraquinone-2,5-disulphonic acid, 1-amino-4-[4'-(4''-amino-3'-sulphophenyl)-anilino]-anthraquinone-2,5-disulphonic acid, 1-amino-4-[4'(4''-amino-2''-sulphophenylazo)-anilino]-anthraquinone-2,5-disulphonic acid and 1-amino-4-(4'-methylamino-3-sulphoanilino)-anthraquinone-2-sulphonic acid.

In class 8:
3-(3'-amino-4'-sulphophenyl)-sulphamyl copper phthalocyanine-tri-3-sulphonic acid, di-4-(3'-amino-4'-sulphophenyl)-sulphamyl copper phthalocyanine-di-4-sulphonic acid and 3-(3'-aminophenylsulphamyl)-3-sulphamyl copper phthalocyanine-di-3-sulphonic acid.

In class 9:
4-amino-3'-nitro-diphenylamine-3,4'-disulphonic acid.

As intermediates which can be converted into the end dyes by diazotisation and/or coupling by the modifications of the process described hereinabove for the manufacture of the fibre-reactive dyes of the formula (1), wherein D is the radical of an azo dye containing sulpho groups, mention may be made of the secondary condensation products of 2,4,6-trifluoro-1,3,5-triazine, a compound of the formula (3), wherein X is a methyl, methoxy or carboxy group or a chlorine atom, and $R_1$ is a hydrogen atom, and of a diazotisable or couplable component which contains a $$\begin{array}{c} HN \\ | \\ R_2 \end{array}$$

group, for example compounds of the formulae

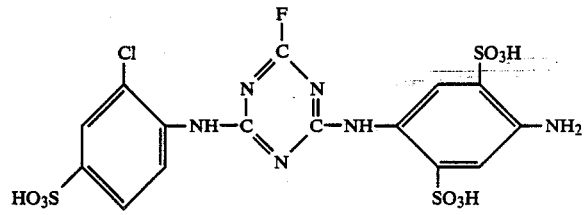

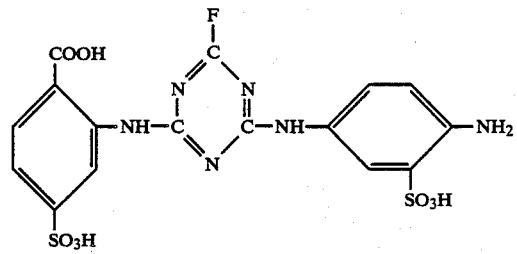

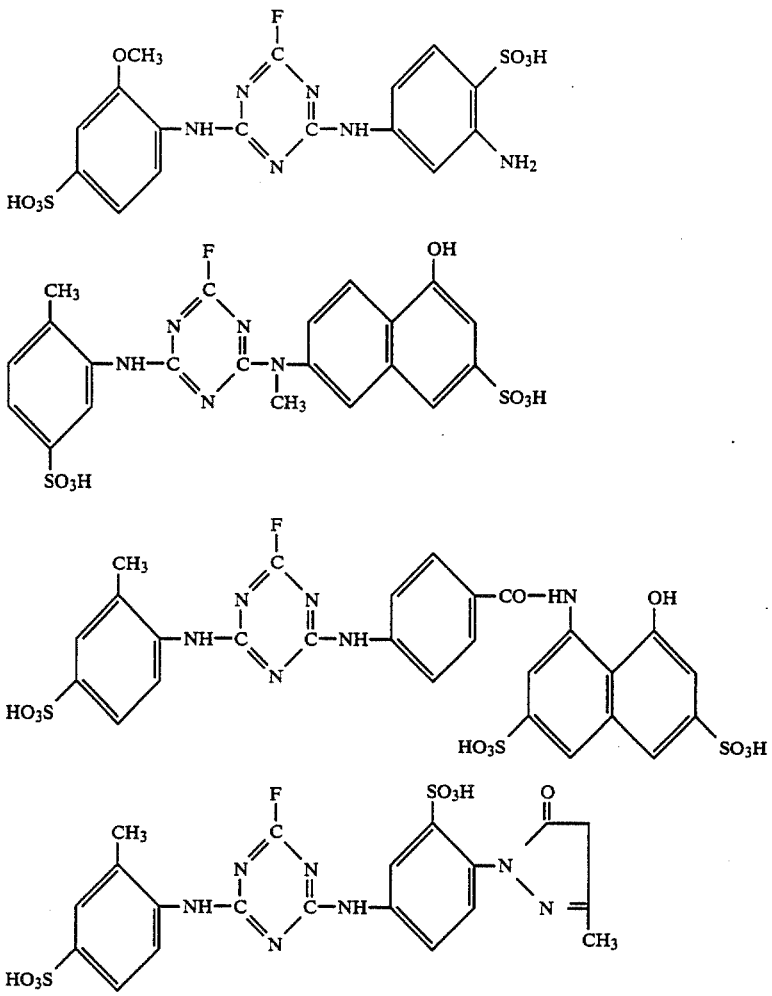

As examples of aromatic primary amines which can be diazotised and coupled with the couplable intermediates, mention may be made of:

aminobenzene, 1-amino-2-, -3- or -4-chlorobenzene, 1-amino-2-, -3- or -4-methylbenzene, 1-amino-2-, -3- or -4-methoxybenzene, 1-amino-3- or -4-acetylaminobenzene, 1-amino-3-acetylaminobenzene-6-sulphonic acid, 1-amino-4-acetylaminobenzene-2-sulphonic acid, 1,4-diaminobenzene-2,6-disulphonic acid, 1-amino-3-nitrobenzene-6-sulphonic acid, 1-amino-4-nitrobenzene-2-sulphonic acid, 1-aminobenzene-2-, -3- or -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-2-methylbenzene-4,6-disulphonic acid, 1-amino-2,4-dimethylbenzene-6-sulphonic acid, 1-amino-4- or -5-chlorobenzene-2-sulphonic acid, 1-amino-3,4-dichlorobenzene-6-sulphonic acid, 1-amino-4-methyl-5-chlorobenzene-2-sulphonic acid, 1-amino-5-methyl-4-chlorobenzene-2-sulphonic acid, 1-amino-4-methoxybenzene-2-sulphonic acid, 1-amino-4-ethoxybenzene-2-sulphonic acid, 1-amino-5-methoxybenzene-2-sulphonic acid, 1-amino-2-carboxybenzene-4- or -5-sulphonic acid, 2-(4'-aminophenyl)-6-methylbenzthiazole-2',7'-disulphonic acid, 4-amino-4-nitrostilbene-2,2'-disulphonic acid, 4-aminoazobenzene-3,4'-disulphonic acid, 1-aminonaphthalene-2-, -4-, -5-, -6-, -7- or -8-sulphonic acid, 2-aminonaphthalene-1-, -5- or -6-sulphonic acid, 1-aminonaphthalene-3,6- or -5,7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid, 2-aminonaphthalene-1,5,7-, -3,6,8-, or -4,6,8-trisulphonic acid.

Coupling Components aniline, N-methylaniline, N-ethylaniline, N-butylaniline, 1-amino-3-methylbenzene, 1-methylamino-3-methylbenzene, 1-amino-3-methyl-6-methoxybenzene, 1-amino-3-acetylaminobenzene, 1-amino-3-ureidobenzene, 1-amino-3-sulphoacetylaminobenzene, 1-amino-2- and -3-methoxybenzene, 1-amino-2,5-dimethoxybenzene, 1-amino-naphthalene-4-, -6- and -7-sulphonic acid, 2-amino-naphthalene-6-sulphonic acid, 2-aminonaphthalene-5,7-disulphonic acid, 1-hydroxynaphthalene-4-, -5- and -8-sulphonic acid, 2-hydroxynaphthalene-4-, -6-, -7- and -8-sulphonic acid, 1-hydroxynaphthalene-3,6-, -4,8- and -5,7-disulphonic acid, 2-hydroxynaphthalene-3,6-, -4,6-, -4,8-, -5,7- or -6,8-disulphonic acid, 1-hydroxynaphthalene-3,6,8-trisulphonic acid, 2-amino-5-hydroxynaphthalene-7-sulphonic acid, 2-methyl- or 2-ethylamino-5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-(3'-aminophenyl)-amino-8-hydroxynaphthalene-6-sulphonic acid, 1-amino-8-hydroxynaphthalene-3,6- or -4,6-disulphonic acid, 1-benzoylamino-8-hydroxynaphthalene-3,6- or -4,6-disulphonic acid, 1-(3'-amino-benzoyl)-amino-8-hydroxynaphthalene-3,6- or -4,6-disulphonic acid, 1-(4'-aminobenzoyl-amino)-8-hydroxynaphthalene-3,6- or -4,6-disulphonic acid, 1-(2'-methyl- or -chloro-4'- or -5'-sulphophenyl)-3-methyl-pyrazolone-(5), 1-(2', 5'-dichloro-4-sulphophenyl)-3-methyl-pyrazolone-(5), 1-(2',4'- or 2',5'-disulphophenyl)-3-methyl-pyrazolone-(5), 1-(4',8'-disulphonaphthyl-2')-3-methyl-pyrazolone-(5), 1-(5',7'-disulphonaphthyl-2')-3-methyl-pyrazolone-(5), 1-(3'-aminophenyl)-3-methyl-pyrazolone-(5), 1-(2'-sulpho-4'-aminophenyl)-3-methyl-pyrazolone-(5), and the corresponding 3-carboxy derivatives, 3-aminocarbonyl-4-methyl-6-hydroxypyridone-(2), 1-ethyl-3-sulphomethyl-4-methyl-6-hydroxypyridone-(2), 1-ethyl-3-cyano- or -chloro-4-methyl-6-hydroxypyridone-(2), 2,4,6-triamino-3-cyanopyridine, 2-(3'-sulphophenylamino)-4,6-diamino-3-cyanopyridine, 2-(2'-hydroxyethylamino)-3-cyano-4-methyl-6-aminopyridine.

The condensation of the 2,4,6-trifluoro-1,3,5-triazine with the compounds of the formula (3) and the dyes containing amino groups of the formula (4) and the diazotisable or couplable components which contain a HN
|
R<sub>2</sub> group, is carried out preferably in an aqueous solution or suspension, at low temperature and at a weakly acid, neutral to weakly alkaline pH value. Advantageously, the hydrogen fluoride liberated during the condensation is continuously neutralised by adding aqueous alkali hydroxides, carbonates or bicarbonates. The diazotisation of the intermediates which contain a diazotisable amino group takes place as a rule by the action of nitrous acid in aqueous-mineral acid solution at low temperature, and the coupling is effected at weakly acid, neutral to weakly alkaline pH values.

The dyes of the present invention are characterised by a pronounced reactivity. They are suitable for dyeing and printing a very wide variety of materials, such as silk, leather, wool, polyamide fibres and polyurethanes, but especially cellulosic materials of fibrous structure, such as linen, cellulose, regenerated cellulose, and chiefly cotton. They are suitable both for the exhaustion process and for dyeing by the pad-dyeing process, in which the goods are impregnated with aqueous and, if appropriate, also with salt-containing dye solutions, and the dyes are fixed after treatment with alkali or in the presence of alkali, optionally with the application of heat.

They are also especially suitable for the cold pad-batch process, wherein the goods are impregnated on a foulard with an aqueous dye solution which contains alkali, and then stored for several hours at room temperature to fix the dye.

It is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

187 Parts of 1-amino-2-methylbenzene-4-sulphonic acid are suspended in 1500 parts of water and a neutral solution is obtained by adding 100 parts of a 40% solution of sodium hydroxide. The solution is cooled to 0° C. by adding ice and at this temperature, 135 parts of 2,4,6-trifluoro-1,3,5-triazine are added dropwise in the course of 30 minutes whilst keeping the pH of the mixture at 5° to 6° C. by the simultaneous dropwise addition of a solution of sodium carbonate. The resultant solution of the primary condensation product is then introduced into a solution of 417 parts of the monosodium salt of the dye of the formula

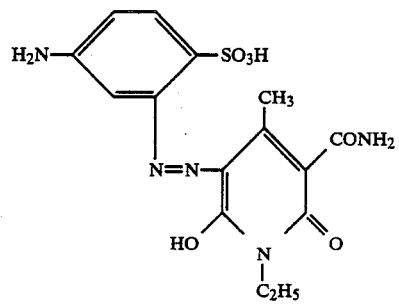

and the pH is kept at 6 by adding sodium hydroxide solution. The condensation is brought to completion by adjusting the pH to 7 at the conclusion, and the reactive dye is precipitated by sprinkling in sodium chloride. The precipitate is collected by suction filtration and the filter cake is mixed with 50 parts of secondary sodium phosphate and dried to yield a yellow dye powder which dyes cotton in fast, greenish-yellow shades. By using instead of 1-amino-2-methylbenzene-4-sulphonic acid equivalent amounts of the amines listed in column II of Table 1 and reacting the monocondensation products obtained in accordance with the particulars of this Example with the dyes containing amino groups listed in column III, further dyes carrying a reactive fluorine atom are obtained, which dye cotton in the shade indicated in the final column of the table.

TABLE 1

| Amine | Dye containing amino groups | Shade on cotton |
|---|---|---|
| 1  1-amino-2-chlorobenzene-5-sulphonic acid | 1-amino-3-acetylamino-benzene-6-sulphonic acid———>  1-(4'-sulphophenyl)-3-methyl-pyrazolone-(5), saponified | yellow |
| 2  1-amino-2,4-dimethylbenzene-5-sulphonic acid | 1-amino-3-nitrobenzene-6-sulphonic acid———>  1-(2',5'-disulphophenyl)-3-methyl-pyrazolone-(5), reduced | " |

TABLE 1-continued

| | Amine | Dye containing amino groups | Shade on cotton |
|---|---|---|---|
| 3 | 1-amino-2-carboxybenzene-4-sulphonic acid | 1-amino-4-nitrobenzene-2-sulphonic acid → 1-(2',5'-dichloro-4'-sulphophenyl)-3-methyl-pyrazolone-(5), reduced | " |
| 4 | 1-amino-2-bromobenzene-4-sulphonic acid | 1-amino-3-acetylamino-benzene-6-sulphonic acid → 1-(2'-chloro-4'-sulphophenyl)-3-carboxy-pyrazolone-(5), saponified | " |
| 5 | 1-amino-2-methylbenzene-4-sulphonic acid | 1-amino-3-nitrobenzene-6-sulphonic acid → 1-(4',8'-disulphonaphthyl-2'-)-3-methyl-pyrazolone-(5), reduced | " |
| 6 | 1-amino-2-chlorobenzene-4-sulphonic acid | 1-aminobenzene-2,5-disulphonic acid → 1-(4'-aminophenyl)-3-methyl-pyrazolone-(5) | " |
| 7 | 1-amino-2-carboxybenzene-5-sulphonic acid | 1-aminobenzene-2,4-disulphonic acid → 1-(2'-methyl-3'-amino-5'-sulphophenyl)-3-methyl-pyrazolone-(5) | " |
| 8 | 1-amino-2-methylbenzene-5-sulphonic acid | 2-aminonaphthalene-1,5-disulphonic acid → 1-(3'-aminophenyl)-3-methyl-pyrazolone-(5) | " |
| 9 | 1-amino-2-methoxybenzene-5-sulphonic acid | 2-aminonaphthalene-1,5-disulphonic acid → 4-amino-4'-(3''-methyl-5''-pyrazolone-1''-yl)-stilbene-2,2'-disulphonic acid | " |
| 10 | 1-amino-2-ethoxybenzene-5-sulphonic acid | 1-amino-3-acetylaminobenzene-6-sulphonic acid → 4-nitro-4'-(3''-methyl-5''-pyrazolone-1''-yl)-stilbene-2,2' disulphonic acid | " |
| 11 | 1-amino-2-methylbenzene-5-sulphonic acid | 2-aminonaphthalene-1,5-disulphonic acid → 1-amino-3-hydroxyacetylaminobenzene | reddish yellow |
| 12 | 1-amino-2,5-dichlorobenzene-4-sulphonic acid | 2-aminonaphthalene-1,5-disulphonic acid → 1-aminonaphthalene-6-sulphonic acid | reddish yellow |
| 13 | 1-amino-2-carboxybenzene-5-sulphonic acid | 2-aminonaphthalene-5,7-disulphonic acid → 1-amino-3-methyl-6-methoxybenzene | strong reddish yellow |
| 14 | 1-amino-2,5-dimethoxybenzene-4-sulphonic acid | 2-aminonaphthalene-5,7-disulphonic acid → 1-aminonaphthalenen-7-sulphonic acid | reddish yellow |
| 15 | 1-amino-2-methylbenzene-4-sulphonic acid | 1-aminonaphthalene-3,7-disulphonic acid → 1-amino-3-methylbenzene | reddish yellow |
| 16 | " | 2-aminonaphthalene-3,6-disulphonic acid → 1-amino-3-acetylaminobenzene | reddish yellow |
| 17 | " | 2-aminonaphthalene-3,6-disulphonic acid → 1-amino-3-methyl-6-methoxybenzene | strong reddish yellow |
| 18 | " | 2-aminonaphthalene-3,6-disulphonic acid → 3-aminophenyl urea | reddish yellow |
| 19 | " | 2-aminonaphthalene-6,8-disulphonic acid → 1-amino-2-methoxynaphthalene-6-sulphonic acid | strong reddish yellow |
| 20 | " | 2-aminonaphthalene-4,8-disulphonic acid → 1-methylamino-3-methylbenzene | yellow |
| 21 | " | 2-aminonaphthalene-4,8-disulphonic acid → 1-amino-3-acetylaminobenzene | " |
| 22 | " | 2-aminonaphthalene-4,8-disulphonic acid → N—butylaniline | " |

TABLE 1-continued

| | Amine | Dye containing amino groups | Shade on cotton |
|---|---|---|---|
| 23 | " | 2-aminonaphthalene-3,6,8-trisulphonic acid ⟶ aniline | reddish yellow |
| 24 | " | 2-aminonaphthalene-3,6,8-trisulphonic acid ⟶ 3-aminophenyl urea | reddish yellow |
| 25 | 1-amino-2-methylbenzene-4-sulphonic acid | 2-aminonaphthalene-3,6,8-trisulphonic acid ⟶ 1-amino-3-acetylamino-6-methylbenzene | reddish yellow |
| 26 | " | 2-aminonaphthalene-3,6,8-trisulphonic acid ⟶ 1-amino-2,5-dimethylbenzene | reddish yellow |
| 27 | " | 2-aminonaphthalene-3,6,8-trisulphonic acid ⟶ 1-aminonaphthalene-6-sulphonic acid | reddish yellow |
| 28 | 1-amino-2-methylbenzene-5-sulphonic acid | 2-aminonaphthalene-4,6,8-trisulphonic acid ⟶ 1-amino-3-acetylaminobenzene | reddish yellow |
| 29 | " | 2-aminonaphthalene-4,6,8-trisulphonic acid ⟶ 1-amino-3-methylbenzene | reddish yellow |
| 30 | " | 1-aminonaphthalene-2,4,7-trisulphonic acid ⟶ 1-amino-3-methylbenzene | reddish yellow |
| 31 | " | 4-nitro-4'-aminostilbene-2,2'-disulphonic acid ⟶ 1-amino-3-acetylaminobenzene | reddish yellow |
| 32 | " | 1-aminobenzene-2,5-disulphonic acid ⟶ 1-aminonaphthalene-7-sulphonic acid | reddish yellow |
| 33 | " | 1-aminobenzene-2,5-disulphonic acid ⟶ 1-amino-3-acetylaminobenzene | yellow |
| 34 | " | 1-aminobenzene-2,4-disulphonic acid ⟶ 1-amino-3-methylbenzene | " |
| 35 | " | 4-aminoazobenzene-3,4'-disulphonic acid ⟶ 1-amino-3-methylbenzene | brownish yellow |
| 36 | " | 1-aminobenzene-2,5-disulphonic acid ⟶ 1-aminonaphthalene-6-sulphonic acid ⟶ 1-aminonaphthalene-8-sulphonic acid | reddish brown |
| 37 | " | 1-aminonaphthalene-2,5,7-trisulphonic acid ⟶ 1-aminonaphthalene-6-sulphonic acid ⟶ 1-aminonaphthalene-8-sulphonic acid | reddish brown |
| 38 | 1-amino-2-methylbenzene-5-sulphonic acid | 1-aminonaphthalene-2,5,7-trisulphonic acid ⟶ 1-amino-2,5-dimethylbenzene ⟶ 1-aminonaphthalene-6-sulphonic acid | reddish brown |
| 39 | 1-amino-2-chlorobenzene-4-sulphonic acid | 1-aminobenzene-2,5-disulphonic acid ⟶ 2-amino-5-hydroxynaphthalene-7-sulphonic acid | orange |
| 40 | 1-amino-2-methylbenzene-5-sulphonic acid | 1-amino-4-methylbenzene-2-sulphonic acid ⟶ 2-amino-5-hydroxynaphthalene-7-sulphonic acid | " |
| 41 | 1-amino-2-carboxybenzene-4-sulphonic acid | 1-amino-4-ethoxybenzene-2-sulphonic acid ⟶ 2-amino-5-hydroxynaphthalene-7-sulphonic acid | scarlet |
| 42 | 1-amino-2-methylbenzene-5-sulphonic acid | 1-amino-4-methoxybenzene-2,5-disulphonic acid ⟶ 2-amino-5-hydroxynaphthalene-7-sulphonic acid | " |

TABLE 1-continued

| | Amine | Dye containing amino groups | Shade on cotton |
|---|---|---|---|
| 43 | " | 2-aminonaphthalene-1,5,7-trisulphonic acid ⟶ 1-amino-5-hydroxynaphthalene-7-sulphonic acid | orange |
| 44 | " | 1-amino-5-chlorobenzene-2-sulphonic acid ⟶ 2-methylamino-5-hydroxynaphthalene-7-sulphonic acid | " |
| 45 | 1-amino-2-methoxybenzene-5-sulphonic acid | 2-aminonaphthalene-4,6,8-trisulphonic acid ⟶ 1-aminobenzene ⟶ 1-aminobenzene | " |
| 46 | " | 1-amino-4-ethoxybenzene-2-sulphonic acid ⟶ 2-amino-8-hydroxynaphthalene-6-sulphonic acid | red |
| 47 | 1-amino-2-bromobenzene-4-sulphonic acid | 1-aminobenzene-2-sulphonic acid ⟶ 1-(4'-aminobenzoyl)-amino-8-hydroxynaphthalene-3,6-disulphonic acid | red |
| 48 | 1-amino-2-ethoxybenzene-5-sulphonic acid | 1-aminobenzene-2,5-disulphonic acid ⟶ 1-(3'-aminobenzoyl)-amino-8-hydroxynaphthalene-4,6-disulphonic acid | red |
| 49 | 1-amino-2-methylbenzene-4-sulphonic acid | 1-amino-3-nitrobenzene-6-sulphonic acid ⟶ 1-propionylamino-8-hydroxynaphthalene-3,6-disulphonic acid, reduced | red |
| 50 | 1-amino-2-methylbenzene-4-sulphonic acid | 1-amino-3-nitrobenzene-6-sulphonic acid ⟶ 1-acetylamino-5-hydroxynaphthalene-7-sulphonic acid, reduced | red |
| 51 | " | 1-amino-4-acetylaminobenzene-2-sulphonic acid ⟶ 1-hydroxynaphthalene-3,6-disulphonic acid, saponified | red |
| 52 | " | 1-hydroxy-2-aminobenzene-4-sulphonic acid ⟶ 2-amino-5-hydroxynaphthalene-7-sulphonic acid, Cu-complex | depp purplish red |
| 53 | " | 1-hydroxy-2-aminobenzene-4,6-disulphonic acid ⟶ 2-amino-5-hydroxynaphthalene-7-sulphonic acid, Cu-complex | deep purplish red |
| 54 | " | 1-amino-2-hydroxy-6-nitronaphthalene-4-sulphonic acid ⟶ 2-ethylamino-5-hydroxynaphthalene-7-sulphonic acid, Cu-complex | deep purplish red |
| 55 | " | 1-amino-2-methylbenzene-4-sulphonic acid ⟶ 1-amino-2-hydroxy-5-methylbenzene ⟶ 1-amino-8-hydroxynaphthalene-4,6-disulphonic acid, Cu-complex | blue |
| 56 | " | 1-amino-2-methylbenzene-4-sulphonic acid ⟶ 1-amino-2-hydroxy-5-methylbenzene ⟶ 1-amino-8-hydroxynaphthalene-4,6-disulphonic acid, Co-complex | grey |
| 57 | " | 1-amino-2-methylbenzene-4-sulphonic acid ⟶ 1-amino-2-hydroxy-5-methylbenzene ⟶ 1-amino-8-hydroxy-naphthalene-4,6-disulphonic acid, Co-complex | greenish black |
| 58 | " | 1-hydroxy-2-aminobenzene-4,6-disulphonic acid ⟶ 1-amino-8-hydroxynaphthalene-4,6-disulphonic acid, Cu-complex | violet |
| 59 | " | 1-hydroxy-2-aminobenzene-5-sulphonic acid ⟶ 1-amino-8-hydroxynaphthalene-3,6-disulphonic acid, Cu-complex | violet |
| 60 | 1-amino-2-methylbenzene-5-sulphonic acid | 1-hydroxy-2-amino-4-acetylaminobenzene-6-sulphonic acid ⟶ 1-amino-8-hydroxynaphthalene-2,4-disulphonic acid, saponified, Cu-complex | blue |
| 61 | 1-amino-2-methylbenzene-5-sulphonic acid | 1-hydroxy-2-amino-6-acetylaminobenzene-4-sulphonic acid ⟶ 1-amino-8-hydroxynaphthalene-2,4-disulphonic acid, saponified, Cu-complex | blue |

TABLE 1-continued

| | Amine | Dye containing amino groups | Shade on cotton |
|---|---|---|---|
| 62 | " | 1-amino-2-hydroxy-6-nitronaphthalene-4-sulphonic acid⟶<br>1-amino-8-hydroxynaphthalene-2,4-disulphonic acid, reduced, Cu-complex | blue |
| 63 | " | 1-amino-2-hydroxy-6-nitronaphthalene-4-sulphonic acid⟶<br>1-amino-8-hydroxynaphthalene-2,4,6-trisulphonic acid, reduced Cu-complex | blue |
| 64 | " | 2-diazo-1-hydroxynaphthalene-4,8-disulphonic acid⟶<br>1-amino-8-hydroxynaphthalene-3,6-disulphonic acid, Cu-complex | blue |
| 65 | " | 1-amino-4-(4'-N—methylaminomethylanilino)-anthraquinone-2,2'-disulphonic acid | blue |
| 66 | " | 1-amino-4-(4'-N—methylaminomethylanilino)-anthraquinone-2,6,2'-trisulphonic acid | greenish blue |
| 67 | " | 1-amino-4-(3'-aminoanilino)-anthraquinone-2,5-disulphonic acid | blue |
| 68 | " | 1-amino-4-(4'-aminocyclohexylamino)-anthraquinone-2,5,8-trisulphonic acid | clear blue |
| 69 | 1-amino-2-methylbenzene-4-sulphonic acid | 1-amino-4-(3'-amino-2',4',6'-trimethyl-anilino)-anthraquinone-2,5'-disulphonic acid | blue |
| 70 | " | 1-amino-4-(3'-N—methylaminomethyl-2',6'-dimethylanilino)-anthraquinone-2,3'-disulphonic acid | blue |
| 71 | " | 1-amino-4-(2'-aminomethyl-4'-methylanilino)-anthraquinone-2,2'-disulphonic acid | blue |
| 72 | " | 1-amino-4-(3'-aminomethyl-2',6'-dimethyl-anilino)-anthraquinone-2,5',6-trisulphonic acid | blue |
| 73 | " | 1-amino-4-(3'-aminomethyl-2',6'-dimethyl-anilino)-anthraquinone-2,5'-disulphonic acid | blue |
| 74 | 1-amino-2-methylbenzene-4-sulphonic acid | 1-amino-4-(3'-aminomethyl-4'-methyl-anilino)-anthraquinone-2,6,6'-trisulphonic acid | blue |
| 75 | " | 1-amino-4-(3'-aminomethyl-4'-methyl-anilino)-anthraquinone-2,6-disulphonic acid | blue |
| 76 | " | 1-amino-4-(4'-amino-anilino)-anthraquinone 2,5,8-trisulphonic acid | greenish blue |
| 77 | " | 1-amino-4-(4'-amino-anilino)-anthraquinone-2,3'-disulphonic acid | " |
| 78 | " | 1-amino-4-(3'-amino-anilino)-anthraquinone-2,4'-disulphonic acid | blue |
| 79 | " | N—(2-carboxy-4-sulphophenyl)-N'—(2'-hydroxy-3-amino-5'-sulphophenyl)-ms-phenylformazane, Cu-complex | blue |
| 80 | " | N—(2-carboxy-5-sulphophenyl)-N'—(2'-hydroxy-3'-amino-5'-sulphophenyl)-ms-phenylformazane, Cu-complex | blue |
| 81 | " | N—(2-carboxy-4-aminophenyl)-N'—(2'-hydroxy-3',5'-disulphophenyl)-ms-(3''-sulphophenyl)-formazane, Cu-complex | blue |
| 82 | " | N—(2-carboxy-4-aminophenyl)-N'—(2'-hydroxy-3',5'-disulphophenyl)-ms-(2''-sulphophenyl)-formazane, Cu-complex | blue |
| 83 | " | N—(2-carboxy-4-sulphophenyl)-N'—(2'-hydroxy-3'-amino-5'sulphophenyl)-ms-(2''-chloro-5''-sulphophenyl)-formazane, Cu-complex | blue |
| 84 | " | N—(2-hydroxy-5-amino-3-sulphophenyl)-N'—(2',5'-disulphophenyl)-ms-phenylformazane, Cu-complex | blue |
| 85 | 1-amino-2-methylbenzene-4-sulphonic acid | N—(2-hydroxy-4,6-disulphophenyl)-N'—(2',4'-disulphophenyl)-ms-(3''-aminophenyl)-formazane, Cu-complex | blue |
| 86 | " | N—(2-hydroxy-4-sulphophenyl)-N'—(4'-amino-2'-sulphophenyl)-ms-(4''-chloro-3''-sulphophenyl)-formazane, Cu-complex | blue |
| 87 | " | N—(2-hydroxy-3-amino-5-sulphophenyl)-N'—(2'-hydroxy-4'-sulphophenyl)-ms-(2''-sulphophenyl)-formazane, Cu-complex | navy vlue |
| 88 | 1-amino-2-methylbenzene-5-sulphonic acid | N—(2-hydroxy-5-sulphophenyl)-N'—(2'-hydroxy-3',5'-disulphophenyl)-ms-(4''-aminophenyl)-formazane, Cu-complex | blue |
| 89 | " | N—(2-carboxy-5-sulphophenyl)-N'—(2'-hydroxy-3',5'-disulphophenyl)-ms-(3''-aminophenyl)-formazane, Cu-complex | greenish blue |
| 90 | " | N—(2-carboxy-5-sulphophenyl)-N'—(2'-hydroxy-5'-amino-3'-sulphophenyl)-ms-(4''-sulphophenyl)-formazane, Cu-complex | blue |
| 91 | " | N—(2-carboxy-5-sulphophenyl)-N'—(2'-hydroxy-4'-methylsulphonyl-6'-sulphophenyl)-ms-(3''-aminophenyl)-formazane, Cu-complex | blue |
| 92 | " | N—(2-carboxy-4-sulphophenyl)-N'—(2'-hydroxy-3'-amino-5'-sulphophenyl)-ms-(4''-methyl-3''-bromophenyl)-formazane, Cu-complex | blue |
| 93 | " | N—(2-carboxy-4-aminophenyl)-N'—(2'-hydroxy-4'-sulphonaphth-1'-yl)-ms-(2''-sulphophenyl)- | blue |

TABLE 1-continued

| Amine | Dye containing amino groups | Shade on cotton |
|---|---|---|
| | formazane, Cu-complex | |
| 94  1-amino-2-methylbenzene-4-sulphonic acid | $\left[\begin{array}{l}3,3',3'',3'''\text{-}\\ \text{Cu—phthalocyanine}\end{array}\right.\begin{array}{l}-(SO_3Na)_n\\ -(SO_2NHC_2H_4NH_2)_{4-n}\end{array}$  $n = \sim 2-3$ | turquoise blue |
| 95  " | $\left[\begin{array}{l}3,3',3'',3'''\text{-}\\ \text{Cu—phthalocyanine}\end{array}\right.\begin{array}{l}-(SO_3Na)_n\\ -(SO_2NH-\bigcirc-NH_2)\end{array}\Big]_{4-n}$  $n = \sim 2-3$ | turquoise blue |
| 96 | $\left[\begin{array}{l}3,3',3'',3'''\text{-}\\ \text{Ni—phthalocyanine}\end{array}\right.\begin{array}{l}-(SO_3Na)_n\\ -(SO_2NH-\bigcirc-NH_2)\end{array}\Big]_{4-n}$  $n = \sim 2-3$ | turquoise blue |
| 97 | $\left[\begin{array}{l}3,3',3'',3'''\text{-}\\ \text{Cu—phthalocyanine}\end{array}\right.\begin{array}{l}-(SO_3Na)_n\\ -(SO_2NH-\bigcirc(NH_2)(SO_3H))\end{array}\Big]_{4-n}$  $n = \sim 2-3$ | turquoise blue |
| 98 | $\left[\begin{array}{l}4,4',4'',4'''\text{-}\\ \text{Cu—phthalo-}\\ \text{cyanine}\end{array}\right.\begin{array}{l}-(SO_3Na)_n\\ -(SO_2NH-\bigcirc(SO_3H)(NHCOCH_2NHCH_3))\end{array}\Big]_{4-n}$  $n = \sim 2-3$ | turquoise blue |

EXAMPLE 2

18.7 Parts of 1-amino-2-methylbenzene-4-sulphonic acid are condensed with 13.5 parts of 2,4,6-trifluoro-1,3,5-triazine in accordance with the particulars of Example 1. To the solution of the primary condensation product is then added a solution of 27.5 parts of the sodium salt of 2-amino-5-hydroxynaphthalene-7-sulphonic acid, whereupon the resultant secondary condensation product precipitates in crystalline form. Stirring is continued until the non-condensed 2-amino-5-hydroxynaphthalene-7-sulphonic acid is no longer detectable whilst keeping the pH at about 6 by the addition of sodium hydroxide solution. To the suspension of the secondary condensation product is then added a diazo suspension, prepared in the conventional way, of 2-aminonaphthalene-1,5-disulphonic acid, and coupling is carried out with the addition of sodium bicarbonate at a pH of 6 to 7. The orange reactive dye is precipitated by adding sodium chloride, collected by filtration, and dried in vacuo. It dyes cellulose materials in reddish orange shades of very good wetfastness properties and good fastness to chlorine. Further azo dyes with similar properties are obtained by reacting the aminonaphtholsulphonic acids listed in column II of Table 2, in accordance with the particulars of this Example, with equivalent parts of the primary condensation products of 2,4,6-trifluoro-1,3,5-triazine and a. 1-amino-2-methylbenzene-4-sulphonic acid
b. 1-amino-2-methylbenzene-5-sulphonic acid
c. 1-amino-2-methoxybenzene-5-sulphonic acid
d. 1-amino-2-ethoxybenzene-5-sulphonic acid
e. 1-amino-2-carboxybenzene-4-sulphonic acid
f. 1-amino-2-carboxybenzene-5-sulphonic acid
g. 1-amino-2-chlorobenzene-4-sulphonic acid
h. 1-amino-2-bromobenzene-4-sulphonic acid
i. 1-amino-2-chlorobenzene-5-sulphonic acid
k. 1-amino-2,5-dichlorobenzene-4-sulphonic acid
l. 1-amino-2,4-dimethylbenzene-5-sulphonic acid
m. 1-amino-2,5-dimethoxybenzene-4-sulphonic acid
n. 1-methylamino-2-carboxybenzene-4-sulphonic acid and subsequently combining the secondary condensation products with the diazo components listed in column II. Column IV indicates the shades in which these dyes colour cellulose fibres.

TABLE 2

| | Aminonaphtholsulphonic acid | Diazo component | Shade on cotton |
|---|---|---|---|
| 1 | 2-amino-5-hydroxynaphthalene-7-sulphonic acid | 1-aminobenzene-2,5-disulphonic acid | orange |
| 2 | " | 1-amino-4-acetylaminobenzene-2-sulphonic acid | " |
| 3 | " | 1-amino-4-chlorobenzene-2-sulphonic acid | " |
| 4 | " | 1-amino-2,4-dimethylbenzene-6-sulphonic acid | " |
| 5 | " | 1-amino-4-ethoxybenzene-2-sulphonic acid | scarlet |
| 6 | " | 2-aminonaphthalene-1,7-disulphonic acid | orange |
| 7 | " | 2-aminonaphthalene-3,6,8-trisulphonic acid | scarlet |
| 8 | 2-methylamino-5-hydroxynaphthalene-7-sulphonic acid | 1-aminobenzene-2-sulphonic acid | orange |

TABLE 2-continued

| | Aminonaphtholsulphonic acid | Diazo component | Shade on cotton |
|---|---|---|---|
| 9 | " | 1-amino-4-methoxybenzene-2-sulphonic acid | scarlet |
| 10 | 1-amino-5-hydroxynaphthalene-7-sulphonic acid | 1-aminobenzene-2,4-disulphonic acid | orange |
| 11 | " | 2-aminonaphthalene-1,5,7-trisulphonic acid | " |
| 12 | 2-amino-8-hydroxynaphthalene-6-sulphonic acid | 1-amino-2-methylbenzene-4,6-disulphonic acid | red |
| 13 | " | 1-amino-2,4-dimethylbenzene-6-sulphonic acid | " |
| 14 | " | 2-aminonaphthalene-1,5-disulphonic acid | " |
| 15 | 1-(4'-aminobenzoylamino)-8-hydroxynaphthalene-3,6-disulphonic acid | 1-aminobenzene-2,4-disulphonic acid | " |
| 16 | 1-(4'-aminobenzoylamino)-8-hydroxynaphthalene-3,6-disulphonic acid | 1-aminobenzene-2-carboxylic acid-4-sulphonic acid | bluish red |
| 17 | 1-(3'-aminobenzoylamino)-8-hydroxynaphthalene-3,6-disulphonic acid | 1-amino-4-chlorobenzene-2-sulphonic acid | bluish red |
| 18 | 1-(3'-aminobenzoylamino)-8-hydroxynaphthalene-3,6-disulphonic acid | 2-aminonaphthalene-1,5-disulphonic acid | " |
| 19 | 1-(4'-aminobenzoylamino)-8-hydroxynaphthalene-4,6-disulphonic acid | 1-amino-4-acetylaminobenzene-2-sulphonic acid | " |
| 20 | 1-(4'-aminobenzoylamino)-8-hydroxynaphthalene-4,6-disulphonic acid | 1-amino-2-methoxybenzene-5-sulphonic acid | " |
| 21 | 1-(3'-aminobenzoylamino)-8-hydroxynaphthalene-4,6-disulphonic acid | 1-amino-2-carboxybenzene-5-sulphonic acid | red |
| 22 | 1-(3'-aminobenzoylamino)-8-hydroxynaphthalene-4,6-disulphonic acid | 1-aminobenzene-2,4-disulphonic acid | " |

EXAMPLE 3

18.7 Parts of 1-amino-2-methylbenzene-4-sulphonic acid are condensed with 13.5 parts of 2,4,6-trifluoro-1,3,5-triazine in accordance with the particulars of Example 1. To this solution is added a solution of 21 parts of the disodium salt of 1,3-diaminobenzene-6-sulphonic acid in 100 parts of water and the mixture is stirred at 10° to 15° C. while constantly neutralising the hydrofluoric acid which is liberated at pH 6 to 6.5 until a sample coupled with tetrazotised dianisidine shows no further violet colouration. After addition of ice, the dye intermediate which has formed is diazotised direct with 7 parts of sodium nitrite and 28 parts of concentrated hydrochloric acid and thereafter combined with a solution of 73 parts of the sodium salt of the copper complex of the formula

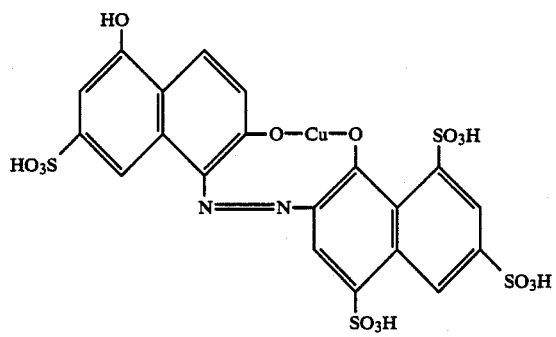

The pH is adjusted to 8 with sodium carbonate and the batch is stirred until the coupling is complete. The dye is salted out with sodium chloride, collected by filtration and dried. It dissolves in water to give a blue solution and dyes cotton in light- and wetfast navy blue shades. Dyes with similar properties are obtained by condensing the diaminobenzene-sulphonic acids listed in column II of Table 3 with equivalent parts of the primary condensation products of 2,4,6-trifluoro-1,3,5-triazine and a. 1-amino-2-methylbenzene-4-sulphonic acid
b. 1-amino-2-methylbenzene-5-sulphonic acid
c. 1-amino-2-methoxybenzene-5-sulphonic acid
d. 1-amino-2-ethoxybenzene-5-sulphonic acid
e. 1-amino-2-carboxybenzene-4-sulphonic acid
f. 1-amino-2-carboxybenzene-5-sulphonic acid
g. 1-amino-2-chlorobenzene-4-sulphonic acid
h. 1-amino-2-bromobenzene-4-sulphonic acid
i. 1-amino-2-chlorobenzene-5-sulphonic acid
k. 1-amino-2,5-dichlorobenzene-4-sulphonic acid
l. 1-amino-2,4-dimethylbenzene-5-sulphonic acid
m. 1-amino-2,5-dimethoxybenzene-4-sulphonic acid
n. 1-ethylamino-2-carboxybenzene-4-sulphonic acid, diazotising the condensation products and coupling the diazonium compounds in accordance with the particulars of this Example with the coupling components listed in column III. The final column of the Table indicates the shade produced on cellulose with the end products.

TABLE 3

| No. | Acylatable diazo component | Coupling component | Shade on cotton |
|---|---|---|---|
| 1 | 1,3-diaminobenzene-6-sulphonic acid | 3-sulphomethyl-4-methyl-6-hydroxy-pyridone-(2) | yellow |
| 2 | 1,4-diaminobenzene-2-sulphonic acid | 1-ethyl-3-sulphomethyl-4-methyl-6-hydroxy-pyridone-(2) | reddish yellow |
| 3 | " | 1-(4',8'-disulphonaphth-2'-yl)-3-methyl-pyrazolone-(5) | " |
| 4 | 1,3-diaminobenzene-6-sulphonic acid | 1-(3'-sulphophenyl)-3-methyl-pyrazolone-(5) | yellow |
| 5 | " | 1-(4-sulphophenyl)-3-carboxy-pyrazolone-(5) | yellow |
| 6 | " | 1-(2'-chloro-5'-sulphophenyl)-3-methyl-pyrazolone-(5) | yellow |
| 7 | 1,4-diaminobenzene-2-sulphonic acid | 1-(5',7'-disulphonaphth-2'-yl)-3-methyl-pyrazolone-(5) | reddish yellow |
| 8 | 1,3-diaminobenzene-6-sulphonic acid | 2-aminonaphthalene-3,6-disulphonic acid | orange |
| 9 | " | 2-aminonaphthalene-5,7-disulphonic acid | orange |
| 10 | " | 2-hydroxynaphthalene-3,6-disulphonic acid | scarlet |
| 11 | " | 1-hydroxynaphthalene-4,6-disulphonic acid | scarlet |
| 12 | " | 2-acetylamino-5-hydroxynaphthalene-7-sulphonic acid | orange |

TABLE 3-continued

| No. | Acylatable diazo component | Coupling component | Shade on cotton |
|---|---|---|---|
| 13 | " | 1-acetylamino-8-hydroxynaphthalene-3,6-disulphonic acid | red |
| 14 | 1,4-diaminobenzene-2-sulphonic acid | 2-acetylamino-5-hydroxynaphthalene-7-sulphonic acid | scarlet |
| 15 | " | 1-acetylamino-5-hydroxynaphthalene-7-sulphonic acid | red |
| 16 | 1,3-diaminobenzene-6-sulphonic acid | 1-benzoylamino-8-hydroxynaphthalene-3,6-disulphonic acid | red |
| 17 | " | 1-acetylamino-8-hydroxynaphthalene-4,6-disulphonic acid | red |

EXAMPLE 4

33.8 Parts of the formazane dye of the formula

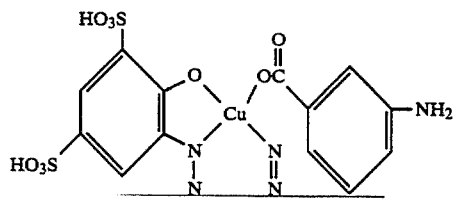

are dissolved neutral in 500 parts by volume of water and the solution is cooled to 0° C. by adding ice. At this temperature 6.8 parts of 2,4,6-trifluoro-1,3,5-triazine are added dropwise and the pH of the reaction mixture is kept at 6 to 7 by the simultaneous addition of 2N sodium hydroxide solution. As soon as the starting dye is no longer detectable, 10.3 parts of 1-amino-2-chlorobenzene-4-sulphonic acid are added. The dye solution is then allowed to warm to room temperature and the hydrofluoric acid liberated during the condensation is continuously neutralised with 2N sodium hydroxide solution. The dye is precipitated by adding sodium chloride, filtered, and dried in vacuo. It dyes cotton from an aqueous liquor in blue shades of very good wet- and lightfastness.

Table 4 lists further dyes which are obtained by reacting 2,4,6-trifluoro-1,3,5-triazine with the dyes containing amino groups listed in column II and subsequently condensing the intermediates obtained with the amines of column III.

TABLE 4

| No. | Dye containing amino groups | Amine | Shade on cotton |
|---|---|---|---|
| 1 | 1-amino-4-(5',7'-disulphonaphth-2'-ylazo)-3-acetyl-aminobenzene | 1-amino-2-methylbenzene-4-sulphonic acid | yellow |
| 2 | 1-amino-4-(4'-8'-disulphonaphth-2'-ylazo)-3-methoxybenzene | " | yellow |
| 3 | 1-(2'-methyl-4'-sulphophenyl)-3-methyl-4-(4"-amino-2",5"-disulphophenylazo)-pyrazolone-(5) | " | yellow |
| 4 | 1-(2',4'-disulphophenyl)-3-methyl-4-(3"-amino-6"-sulphophenylazo)-pyrazolone-(5) | 1-amino-2-methoxybenzene-4-sulphonic acid | yellow |
| 5 | 1-ethyl-3-(4'-amino-2',5'-disulphophenylazo)-4-methyl-5-aminocarbonyl-6-hydroxy-pyridone-(2) | 1-amino-2-chlorobenzene-5-sulphonic acid | yellow |
| 6 | 3-(3'-amino-6'-sulphophenylazo)-4-sulphomethyl-5-aminocarbonyl-2,6-dihydroxypyridine | 1-amino-2-bromobenzene-4-sulphonic acid | yellow |
| 7 | 2-amino-6-(1',5'-disulphonaphth-2'-ylazo)-5-hydroxynaphthalene-7-sulphonic acid | 1-amino-2-carboxybenzene-4-sulphonic acid | orange |
| 8 | 2-methylamino-6-(4'-ethoxybenzene-2'-sulphophenylazo)-5-hydroxynaphthalene-7-sulphonic acid | 1-amino-2-methylbenzene-4-sulphonic acid | scarlet |
| 9 | 1-(3'-aminobenzoylamino)-7-(4"-methyl-2"-sulphophenylazo)-8-hydroxynaphthalene-3,6-disulphonic acid | 1-amino-2-methylbenzene-4-sulphonic acid | red |
| 10 | 1-(4'-aminobenzoylamino)-7-(1"-sulphonaphth-2"-ylazo)-8-hydroxynaphthalene-3,6-disulphonic acid | 1-amino-2-methylbenzene-4-sulphonic acid | bluish red |
| 11 | 1-amino-7-(2'-hydroxy-5'-amino-3'-sulphophenylazo)-8-hydroxynaphthalene-2,4-disulphonic acid, Cu-complex | " | blue |
| 12 | 1-amino-(4'-aminophenylamino)-anthraquinone-2,3'-disulphonic acid | 1-amino-2-chlorobenzene-4-sulphonic acid | blue |
| 13 | 1-amino-(3'-aminophenylamino)-anthraquinone-2,4'-disulphonic acid | " | blue |
| 14 | N—(2-carboxy-4-aminophenyl)-N'—(2'-hydroxy-3',5'-disulphophenyl)-ms-(3"-sulphophenyl)-formazane, Cu-complex | " | blue |
| 15 | N—(2-hydroxy-3-amino-5-sulphophenyl)-N'—(2'-hydroxy-4'-sulphophenyl)-ms-(2"-sulphophenyl)-formazane, Cu-complex | 1-amino-2-chlorobenzene-4-sulphonic acid | |
| 16 | $\begin{bmatrix} 3,3',3'',3'''- \\ Cu\text{—phthalocyanine} \end{bmatrix} \begin{matrix} -(SO_3Na)_n \\ -(SO_2NHC_2H_4NH_2)_{4-n} \end{matrix}$ $n = \sim 2-3$ | " | turquoise blue |

EXAMPLE 5

20.8 parts of 1-amino-2-chloro-benzene-5-sulphonic acid are dissolved neutral in 200 parts of water, and a solution of 1 part of secondary sodium phosphate in 50 parts of water is added. The solution is cooled to 0° to 2° C. and at this temperature, 13.8 parts of 2,4,6-trifluoro-1,3,5-triazine are added dropwise in the course of 15 minutes, whilst the solution is well stirred the pH is allowed to fall to 6.5. Then the pH of the reaction mixture is kept at 6.5 by the simultaneous addition of 2N sodium hydroxide solution. After completion of the condensation, to the reaction mixture is added a neutral solution of 17.8 parts of 1,3-diaminobenzene-4-sulphonic acid in 250 parts of water. The condensation is carried out at 5° to 10° C. and a pH of 6 to 6.5, and the hydrofluoric acid liberated during the condensation is continuously neutralised with 2N sodium hydroxide solution. After completion of the reaction the solution which contains the secondary condensation product is cooled to 0° to 5° C., and 35 parts by volume of hydrochloric acid (33%) are added whereupon a precipitate is formed. Subsequently 23 parts by volume of 4N sodium nitrite solution are added, and the diazotisation is continued for 30 minutes. The excess nitrite is eliminated with amido sulphonic acid, and to the resultant suspension is added 18.6 parts of 1-ethyl-3-carbamoyl-4-methyl-6-hydroxypyridone-(2) in 150 parts of water. When the coupling is complete, at a pH of 7 the dyestuff is salted out, collected by suction filtration, dried and ground. A yellow easily water-soluble powder is obtained which dyes cotton according to application processes suitable for fluoro-triazine dyes in strong greenish-yellow shades.

The dyestuff has the formula

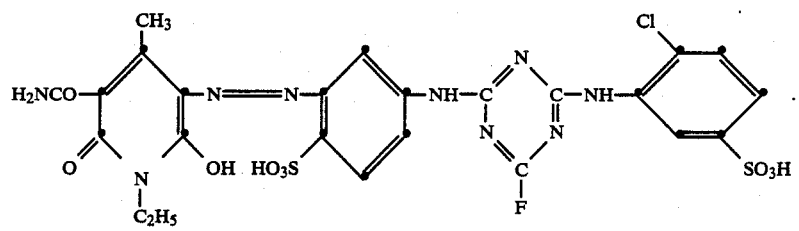

Dyeing Procedure 1

2 parts of the dye obtained in Example 1 are dissolved at 20° to 50° C. in 100 parts of water with the addition of 5 to 20 parts of urea and 2 parts of calcined sodium carbonate. A cotton fabric is impregnated with this solution to a pick-up of 60 to 80% and then dried. The fabric is then thermofixed for 30 seconds to 5 minutes at 140° to 210° C., subsequently soaped for 15 minutes in a 0.1% boiling solution of a non-ionic detergent, rinsed and dried.

Dyeing Procedure 2

2 parts of the dye obtained in Example 1 are dissolved at 40° C. in 2000 parts of water with the addition of 120 parts of sodium chloride or calcined Glauber's salt. Then 100 parts of a cotton fabric are put into this dyebath and the temperature is kept constant for 30 to 60 minutes. 10 parts of calcined sodium carbonate and 4 ml of sodium hydroxide solution (36° Bé) are then added. The temperature is kept for a further 45 to 60 minutes at 40° C. and the fabric is then soaped for 15 minutes in a 0.1% boiling solution of a non-ionic detergent, rinsed and dried.

Dyeing Procedure 3

2 parts of the dye obtained according to Example 1 are dissolved in 100 parts of water while adding 0.5 part of sodium m-nitrobenzenesulphonate. A cotton fabric is impregnated with the resultant solution to a liquor pick-up of 75% and then dried. The fabric is then impregnated with a warm solution of 20° C. which contains, per litre, 5 g of sodium hydroxide and 250 g of sodium chloride, and squeezed out to a pick-up of 75%. The dyeing is steamed for 30 seconds at 100° to 101° C., rinsed, soaped for 15 minutes in a 0.3% boiling solution of a non-ionic detergent, rinsed and dried.

Dyeing Procedure 4

2 parts of the dye obtained according to Example 1 are dissolved in 100 parts of water. The solution is added to 1900 parts of cold water, 60 parts of sodium chloride are added and 100 parts of a cotton fabric are put into this dyebath. The temperature is raised to 60° C. and another 60 parts of sodium chloride are added after 30 minutes, and then 10 parts of calcined sodium carbonate are added after 10 minutes. The temperature is kept for 30 minutes at 60° C. The dyeing is rinsed and then soaped for 15 minutes in a 0.3% boiling solution of a non-ionic detergent, rinsed and dried.

Dyeing Procedure 5

4 parts of the dye obtained according to Example 1 are dissolved in 50 parts of water. 50 parts of a solution which contains, per litre, 0.2 g of sodium hydroxide and 1 g of calcined sodium carbonate, are added. A cotton fabric is impregnated on a foulard with the resultant solution to a liquor pick-up of 70% and then wound onto a roller. The fabric is stored for 3 to 6 hours at room temperature. The dyeing is rinsed and then soaped for 15 minutes in a boiling solution of a non-ionic detergent, again rinsed and dried.

What is claimed is:

1. Fibre-reactive dye, of the formula

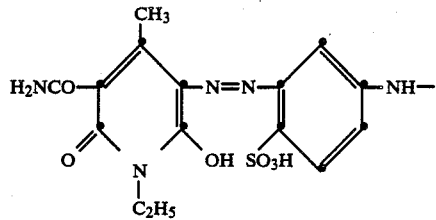

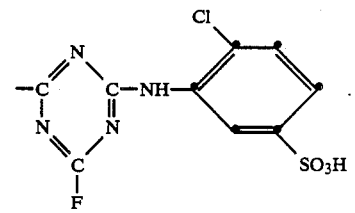

* * * * *